US006609595B2

United States Patent
Flynn et al.

(10) Patent No.: US 6,609,595 B2
(45) Date of Patent: Aug. 26, 2003

(54) ELECTRIC PARKING BRAKE WITH DIRECT TENSION FEEDBACK

(75) Inventors: Charles L. Flynn, Davisburg, MI (US); Casimir R. Kiczek, Plymouth, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 09/974,133

(22) Filed: Oct. 9, 2001

(65) Prior Publication Data

US 2003/0066714 A1 Apr. 10, 2003

(51) Int. Cl.[7] ............................................... F16D 63/36
(52) U.S. Cl. ....................................................... 188/156
(58) Field of Search ............................... 188/2 D, 71.8, 188/71.9, 79.51, 265, 202, 196 V, 156, 158, 171; 74/501.5 R, 502.4

(56) References Cited

U.S. PATENT DOCUMENTS

| 4,838,109 | A | | 6/1989 | Stewart |
| 5,004,007 | A | | 4/1991 | Carlson et al. |
| 5,180,038 | A | | 1/1993 | Arnold et al. |
| 5,235,867 | A | | 8/1993 | Wortmann et al. |
| 5,542,513 | A | * | 8/1996 | Reyes ..................... 192/219.4 |
| 5,590,744 | A | | 1/1997 | Belmond |
| 6,213,259 | B1 | * | 4/2001 | Hanson et al. ............. 188/156 |
| 6,386,338 | B1 | * | 5/2002 | Powrozek ............... 188/106 P |
| 2002/0066626 | A1 | * | 6/2002 | Gill et al. .................. 188/158 |

FOREIGN PATENT DOCUMENTS

EP 0527518 7/1992

* cited by examiner

*Primary Examiner*—Christopher P. Schwartz
*Assistant Examiner*—Xuan Lan Nguyen
(74) *Attorney, Agent, or Firm*—Casimir R. Kiczek

(57) ABSTRACT

A parking brake assembly includes an electric motor having an output shaft, a control module coupled to the motor for controlling the motor and a transmission coupling a threaded lead screw to the output shaft of the motor. A drive nut has a lead screw bore threadably receiving the lead screw therein and a guide shaft bore slidingly receiving the elongate guide shaft therein. The drive nut also has a cable attachment for attaching a brake cable to the drive nut. A retainer member is coupled to the attachment point and a biasing member urges the retainer member away from a seat. A tension feedback device measures the displacement of the retainer toward the seat. The displacement is proportional to the cable tension when a predetermined displacement is achieved. The operation of the electric motor is stopped when the tension feedback device measures the predetermined distance and the brake is set.

22 Claims, 9 Drawing Sheets

ELECTRIC PARKING BRAKE WITH DIRECT TENSION FEEDBACK

FIELD OF THE INVENTION

The present invention generally relates to parking brakes and, more particularly, to electrically powered parking brakes with direct tension feedback.

BACKGROUND AND SUMMARY OF THE INVENTION

Almost all vehicles have a parking brake mechanism, and most of these vehicles have a hand or foot activated lever for manually actuating the parking brake mechanism. Typically, these levers are attached to a cable that causes displacement of the cable and operation of the attached parking brake mechanism. There is a need to provide an electrically actuated cable mechanism that operates reliably with a minimum number of parts and has a low cost, so that manually actuated mechanism may be replaced or easily selectively replaced.

It is known in the art to provide electric-motor driven brake systems. For example, see U.S. Pat. Nos. 4,281,736, 4,561,527, 4,629,043, 4,795,002, 4,865,165, 5,004,077, 5,180,038, 5,485,764, 5,542,513, and 5,590,744 which each disclose an electric motor-driven brake system, the disclosures of which are expressly incorporated herein in their entirety by reference.

While these electric-motor driven brake systems may adequately actuate the brake mechanisms with varying degrees of success, they are inefficient, typically can be used in conjunction with only one type of cable system, must be mounted within the vehicle, have relatively large package sizes and utilize a large number of components and they are relatively heavy. Additionally, when applying the brakes, the control module is adapted to stop the rotation of the electric motor when a predetermined tension is achieved in the cable. Cable tension is determined by measuring cable travel using a positive encoder or a motor current using a shunt. Both of these devices measure and control cable tension indirectly. However electric motor torque is not constant with temperature, over time cables stretch, and rotating components wear which could lead to the application of insufficient cable tension to the brakes and ultimately park brake failure. Accordingly, there is a need in the art for an improved electric parking brake assembly which measures cable tension directly, has a relative small package size, has a relatively small number of components, is relatively light weight, and overcomes many of the shortcomings of prior art devices.

The present invention provides an electric brake assembly for tensioning a brake cable attached to a brake. The brake assembly, in combination, includes an electric motor with an output shaft and a transmission adjacent to the output shaft. The transmission has a threaded lead screw coupled to the output shaft. Also, a drive nut is adjacent to the lead screw. The drive nut is adapted to move linearly when the lead screw is rotated. The drive nut has a portion forming a bore and a seat. The cable extends through the bore. The cable has an attachment portion. A retainer member is coupled to the attachment portion. A housing member is disposed in the bore to urge the retainer member away from the seat. Additionally, a tension feedback device is adjacent to the attachment point. The tension feedback device is adaptable to determine the displacement of the cable toward the seat when the output shaft is rotated and is adapted to stop the rotation of the output shaft when the cable moves a predetermined distance.

In accordance with another aspect, the present invention, a tension device is adapted for controlling the tension load in a cable that is actuated by an electric motor having an output shaft and a transmission coupled to the output shaft and including a lead screw. The tension device, in combination, includes a drive nut coupled to the lead screw. The drive nut is adapted to move linearly when the lead screw is rotated. The drive nut has a bore, counter bore and a ledge between the bore and counter bore. The cable extends through the bore. The cable has an attachment portion. A retainer is coupled to the attachment portion. A biasing member is disposed in the counter bore and urges the retainer away from the ledge. Additionally, a tension feedback device is adjacent to the retainer. The tension feedback device is adapted to measure the displacement of the cable toward the ledge when the electric motor rotates the lead screw and is adapted to stop the rotation of the electric motor when the cable is displaced a predetermined distance.

According to yet another aspect of the present invention, a tension-sensing device is adapted for measuring the load on a cable attached to a brake. The device, in combination, includes an electric motor having an output shaft. A control module is coupled to the electric motor for controlling the rotation of the output shaft. The transmission is adjacent to the output shaft. The transmission has a threaded lead screw coupled to the output shaft in rotation therewith. A drive nut is adjacent to the lead screw. The drive nut moves linearly along the lead screw when the lead screw is rotated. The drive nut has a portion forming a bore and a seat. One end of the cable extends through the bore. An attachment portion is on one end of the cable. A retainer member is coupled to the attachment portion. A biasing member is disposed in the bore and urges the retainer member away from the seat. Additionally, a tension feedback device is adjacent to the retainer. The tension feedback device is adapted to measure the displacement of the cable toward the seat when the electric motor rotates the lead screw and is further adapted to provide a signal to the controller when a predetermined distance forms between the feedback device and retainer in order to stop the rotation of the electric motor.

An advantage of the present system is that cable tension load is determined by the displacement of the cable relative and the biasing member as measured by a tension feedback device. This eliminates cable tension load variability due to temperature effects, cable stretch, and wear of rotating mechanical components.

From the foregoing disclosure and the following more detailed description of various preferred embodiments it will be apparent to those skilled in the art that the present invention provides a significant advance in the technology of electric parking brakes. Particularly significant in this regard is the potential the invention affords for providing a high quality, reliable, light weight, small packaged, easily assembled and disassembled, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 2:
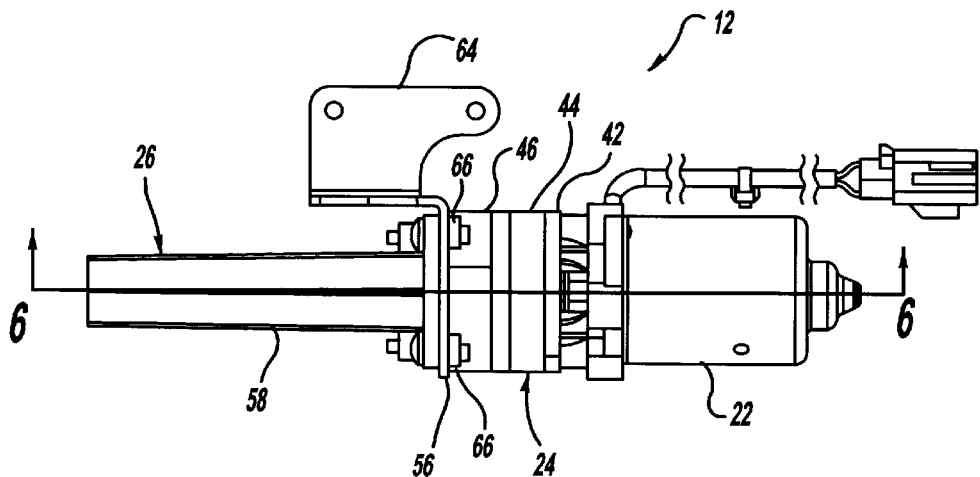
FIG. 2 is a top plan view of a cable tensioning device of the electric parking brake system of FIG. 1, wherein some components are removed for clarity.
Figure 4:
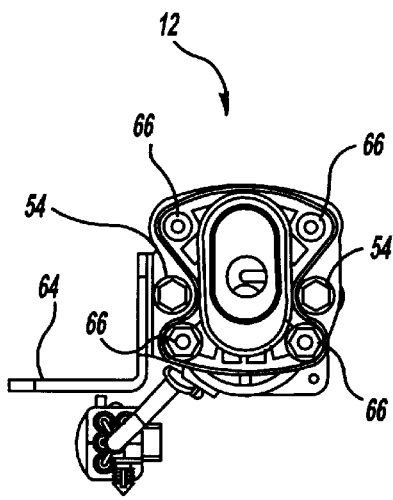
FIG. 4 is an elevational view of the rearward end of the cable-tensioning device of FIGS. 2 and 3.
Figure 3:
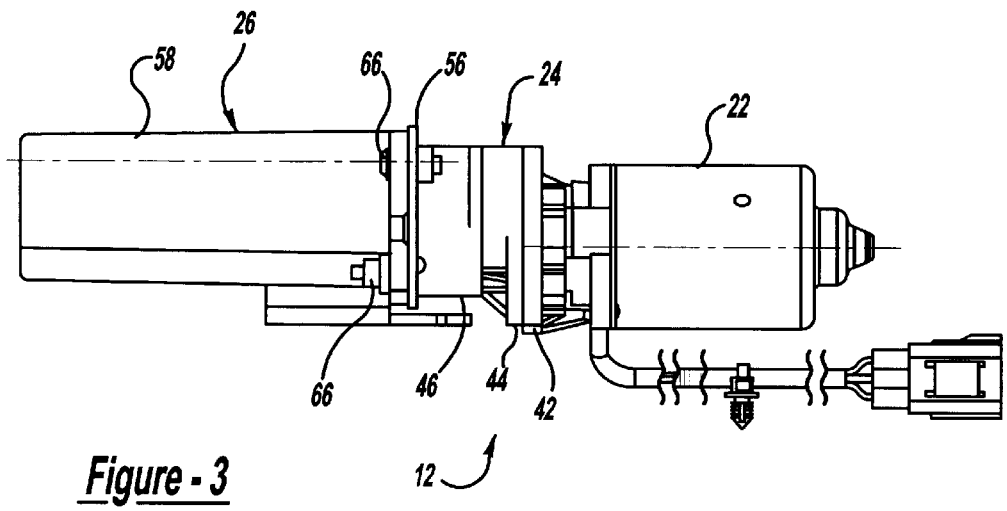
FIG. 3 is a side elevational view of the cable-tensioning device of FIG. 2.
Figure 5:
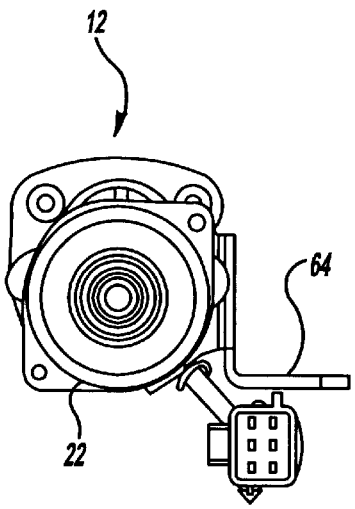
FIG. 5 is an elevational view of the forward end of the cable-tensioning device of FIGS. 2 to 4.
Figure 6:
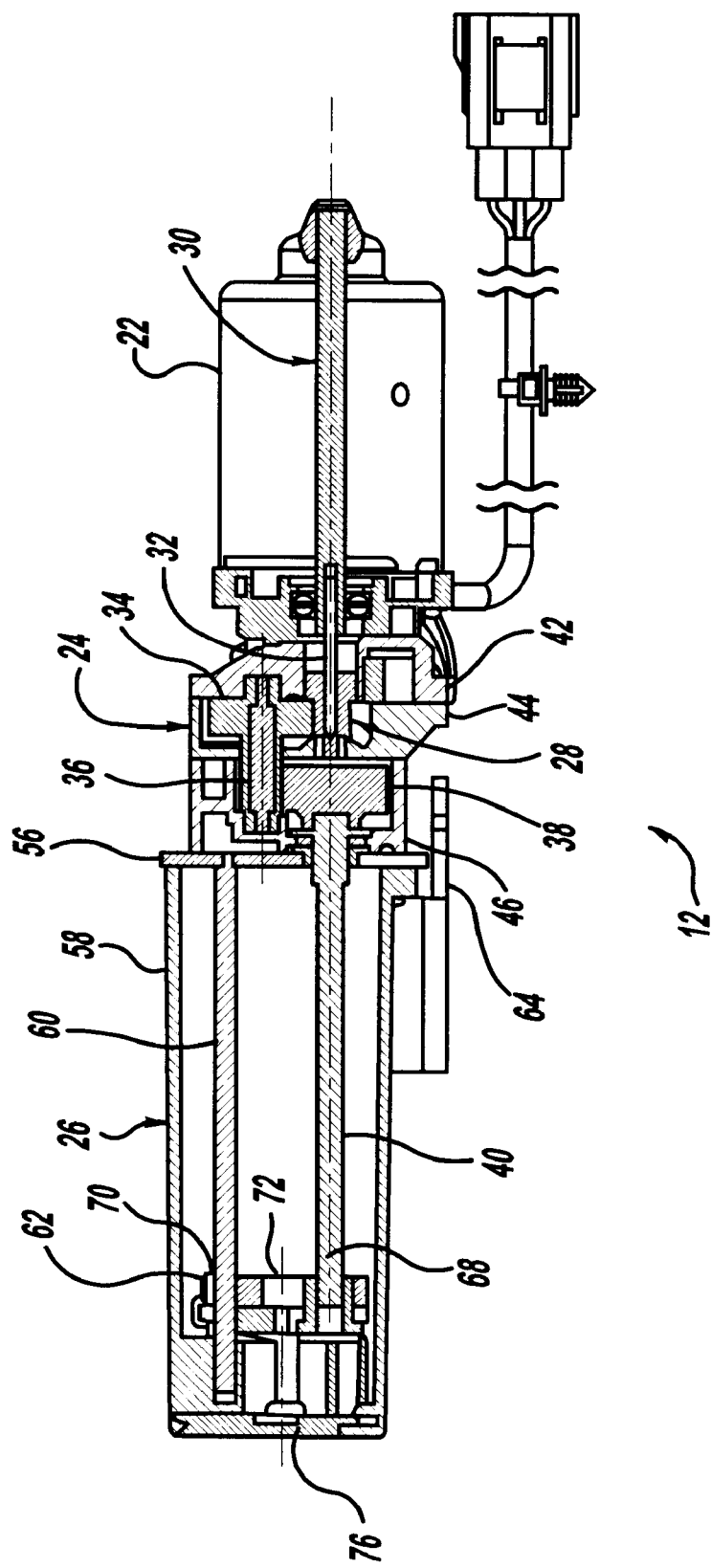
FIG. 6 is a cross-sectional view of the cable-tensioning device of FIGS. 2 to 5 taken along line 6—6 of FIG. 2.

It should be understood that the appended drawings are not necessarily to scale, presenting a somewhat simplified representation of various preferred features illustrative of the basic principles of the invention. The specific design features of the electric parking brake system as disclosed herein, including, for example, specific dimensions, orientations, and shapes of the transmission and drive nut will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the electric parking brake systems illustrated in the drawings. In general, up or upward refers to an upward direction in the plane of the paper in FIG. 2 and down or downward refers to a downward direction in the plane of the paper in FIG. 2. Also in general, fore or forward refers to a direction toward the front of the motor vehicle, that is, in a direction in the plane of the paper toward the right of the figure in FIG. 2 and aft or rearward refers to a direction toward the rear of the motor vehicle, that is, in a direction in the plane of the paper toward the left of the figure in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved electrically actuated, motor driven cable-tensioning device disclosed herein. The following detailed discussion of various alternative and preferred embodiments will illustrate the general principles of the invention with reference to an electric parking brake (hereinafter the "EPB") system for use with a motor vehicle. Other embodiments suitable for other applications will be apparent to those skilled in the art given the benefit of this disclosure.

The EPB system disclosed herein is designed for use with a motor vehicle, such as an automobile, according to a preferred embodiment of the present invention. While the illustrated embodiments of the present invention are particularly adapted for use with an automobile, it is noted that the present invention can be utilized with any motor vehicle having a parking brake including trucks, buses, vans, recreational vehicles, earth moving equipment and the like, and off road vehicles such as dune buggies, golf carts, industrial equipment and the like.

Figure 1:
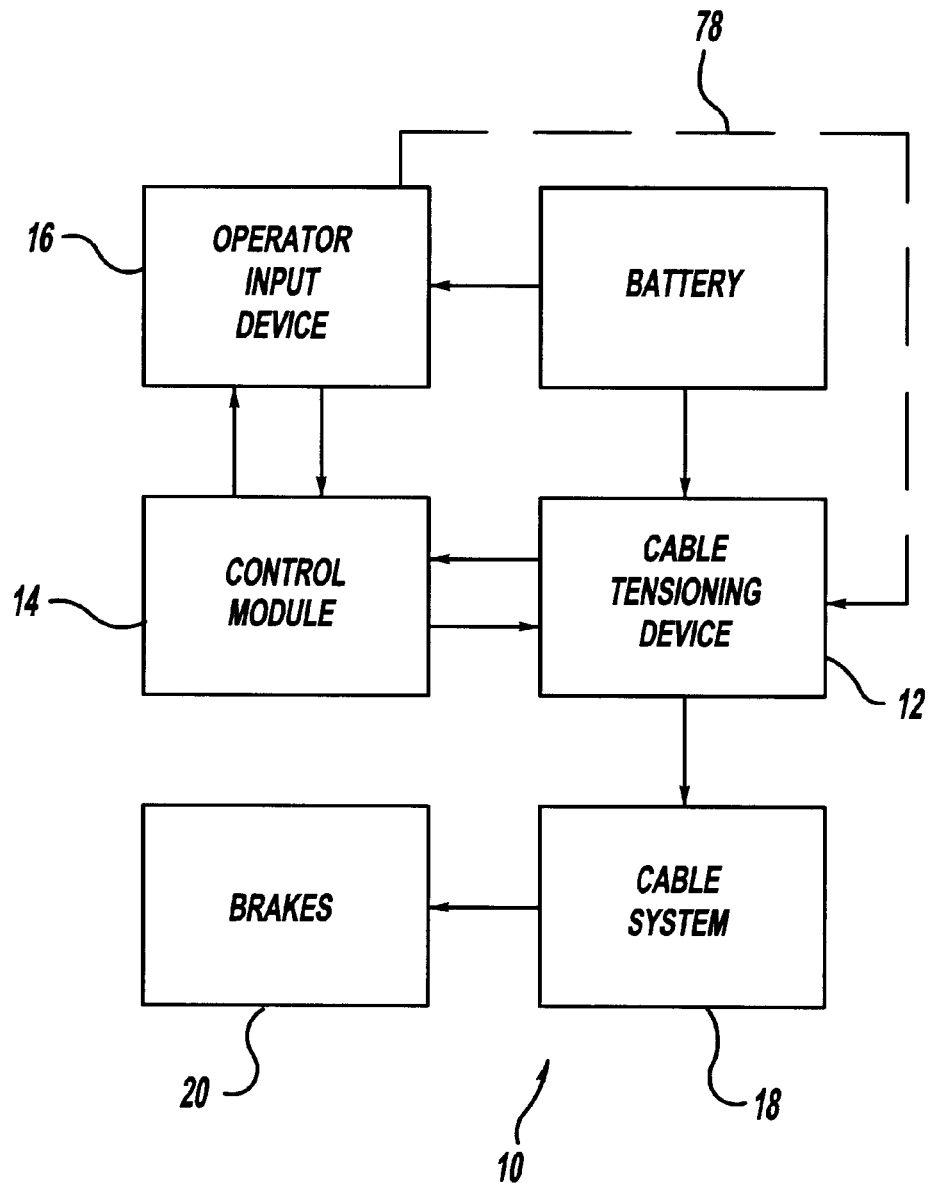
FIG. 1 is a block diagram of an electric parking brake system according to the present invention.

As best shown in FIG. 1, the EPB system, according to the present invention, is designated by the numeral 10 and comprises cable tensioning device 12 for producing a linear motion; an electronic controller or control module 14 for controlling the cable tensioning device 12; an operator input device 16 for sending operator inputs to the control module 14; and a cable system 18 for transmitting the linear motion of the cable tensioning device 12 to park brake arms/pads of a conventional braking system 20.

As shown in FIGS. 2–6, the illustrated cable-tensioning device 12 includes electric motor 22, transmission assembly 24, drive nut assembly 26, and tension feedback device 80. Electric motor 22 is preferably a permanent magnet direct current (DC) motor, which can selectively rotate in either direction depending on the provided control signal.

Transmission assembly 24 includes a gear train of helical or spur gears and transmission housing members generally enclosing the gear train. While the illustrated transmission assembly utilizes helical gears to adjust shaft speed and torque in a desired manner, it should be noted that other means for reducing speed and increasing torque can be utilized such as a belt system and other types of gear members can be utilized, such as, worm gears. The illustrated gear train include first pinion gear 28 driven by output or drive shaft 30 of electric motor 22 through connecting shaft 32, idler gear 34 engaging and driven by first pinion gear 28, second pinion gear 36 rotatable with idler gear 34, lead screw gear 38 engaging and driven by second pinion gear 36, and lead screw 40 rotatable with lead screw gear 38.

Figure 7:
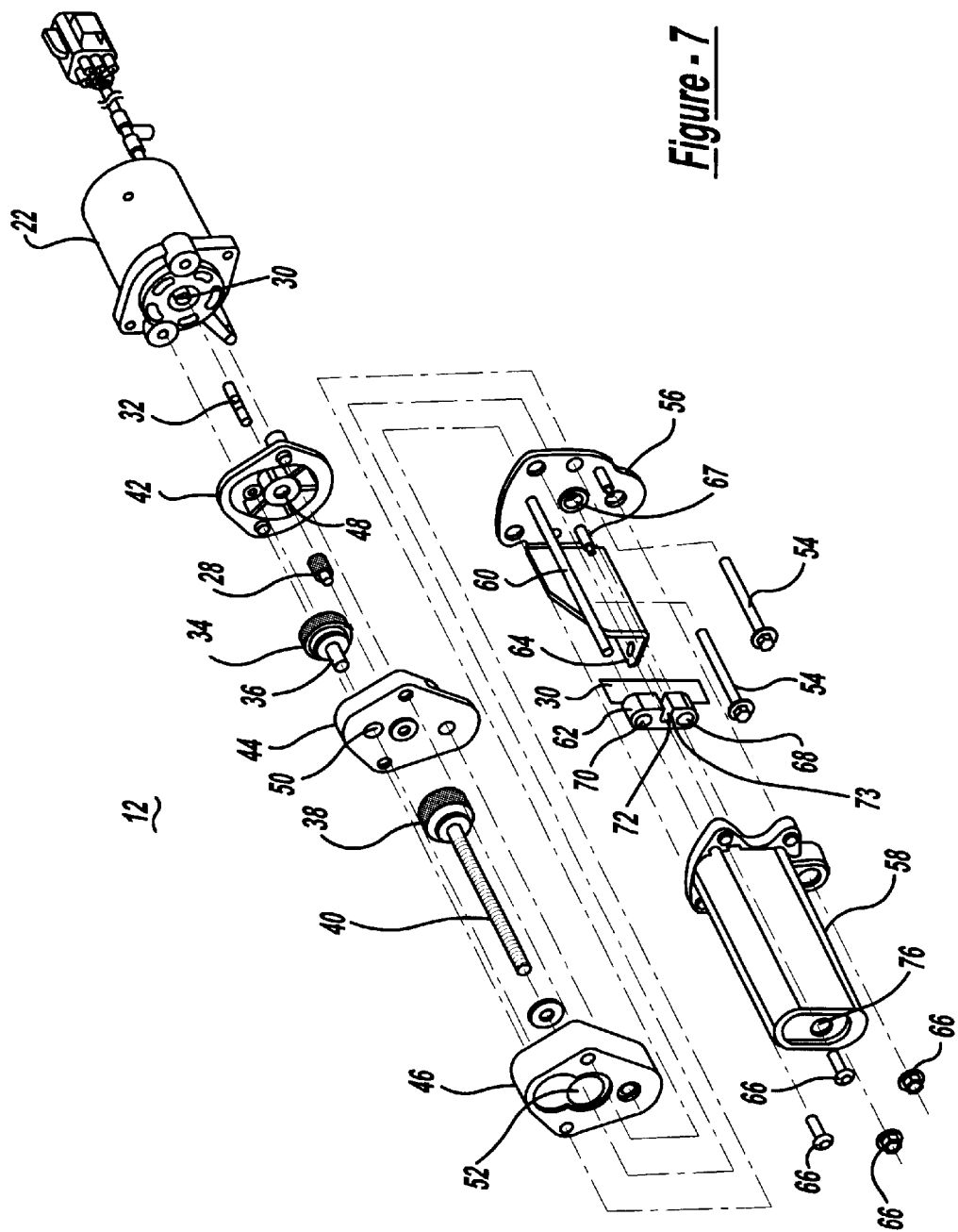
FIG. 7 is an exploded perspective view of the cable-tensioning device of with some components removed for clarity.

The transmission housing assembly includes end plate 42, housing 44, and end cap 46. End plate 42 cooperates with housing 44 to form first interior chamber for housing the first stage of the gear train, that is, first pinion gear 28 and idler gear 34. End plate 42 has opening 48 (as best shown in FIG. 7) therein for connection of connecting shaft 32 to first pinion gear 28. End cap 46 cooperates with housing 44 to form a second interior chamber for housing the second stage of the gear train, that is, second pinion gear 36 and lead screw gear 38. Housing 44 has opening 50 (as best shown in FIG. 7) therein to connect idler gear 34 and second pinion gear 36. End cap 46 has opening 52 (as best shown in FIG. 7) therein to connect lead screw gear 38 and lead screw 40, which extends outside the housing assembly. Suitable means are preferably provided for sealing opening 52. Components 42, 44, 46 of the illustrated housing assembly are clamped together between electric motor 22 and drive nut assembly 26 by a plurality of mechanical fasteners 54. It should be noted that the housing assembly can alternatively be secured in any other suitable manner.

First pinion gear 28 is mounted for rotation, relative to the housing assembly, in a pair of hubs or bushings formed in end plate 42 and housing 44. First pinion gear 28 is preferably substantially coaxial with drive shaft 30 of electric motor 22 and connected thereto by connecting shaft 32. Connecting shaft 32 is preferably a suitable flex shaft to account for any misalignment therebetween. Connected in this manner, first pinion gear 28 rotates along with drive shaft 30 of electric motor 22. Idler gear 34 is mounted for rotation, relative to the housing assembly, in a pair of hubs or bushings formed in end plate 42 and housing 44. The rotational axis of idler gear 34 is preferably substantially parallel and spaced apart from the rotational axis of first pinion gear 28. Idler gear 34 is positioned such that it engages and interconnects with first pinion gear 28 so that idler gear 34 rotates upon rotation of first pinion gear 28.

Second pinion gear 36 is mounted for rotation, relative to the housing assembly, in a pair of hubs or bushings formed in housing 44 and end cap 46. Second pinion gear 36 is preferably substantially coaxial with idler gear 34 and rigidly connected thereto so that rotation of idler gear 34 rotates second pinion gear 36. Idler gear 34 and second pinion gear 36 can be formed of either integral or unitary members. Lead screw gear 38 is mounted for rotation, relative to the housing assembly, in a pair of hubs or bushings formed in housing 44 and end cap 46. The rotational axis of lead screw gear 38 is preferably substantially parallel and spaced apart from the rotational axis of second pinion gear 36. Lead screw gear 38 is positioned such that it engages and interconnects with second pinion gear 36 so that lead screw gear 38 rotates upon rotation of second pinion gear 36. Preferably, lead screw gear 38 is substantially coaxial with first pinion gear 28, connecting shaft 32, and motor drive shaft 30.

Gear elements 28, 34, 36, 38, 40 are sized as required depending on the particular electric motor 22 utilized and the torque and speed requirements of system 10. The transmission gear train of the illustrated embodiment produces a 9/1 ratio by having two 3:1 stages in series: first pinion gear 28 to idler gear 34, and second pinion gear 36 to lead screw gear 38. It should be noted that the gear train can alternatively have a fewer or greater number of stages, can have stages with different ratios, and can have a different overall ratio.

Drive nut assembly 26 includes mounting bracket 56, cover 58, guide shaft 60, and drive nut 62. Mounting bracket 56 and cover 58 cooperate to form an elongate interior space as described in more detail hereinafter. Mounting bracket 56 is provided with mounting flange 64 for securing cable-tensioning device 12 to the motor vehicle. Mounting bracket 56 cooperates with mechanical fasteners 54 to clamp transmission-housing members 42, 44, 46 together. Cover 58 is secured to mounting bracket 56 in any suitable manner such as the illustrated mechanical fasteners 66. It should be noted that mounting bracket 56 and cover 58 can be alternatively secured in any other suitable manner.

Lead screw 40 is an elongate threaded member sized and shaped to threadably engage drive nut 62 as described in more detail hereinafter. Lead screw 40 is mounted for rotation, relative to the transmission housing, mounting bracket 56, and cover 58, in a hub or bushing located in mounting bracket 56. Any suitable bushing can be provided. Lead screw 40 is preferably substantially coaxial with lead screw gear 38, first pinion gear 28, connecting shaft 32, and motor drive shaft 30 and is rigidly connected thereto so that rotation of lead screw gear 38 rotates lead screw 40. Lead screw gear 38 and lead screw 40 can be formed of either integral or unitary members. Mounting bracket 56 has opening 67 therein for support of the bushing and passage of the lead screw therethrough. Suitable means for sealing opening 67 are provided as is conventional. Lead screw 40 preferably extends at least a substantial portion of the interior space formed by mounting bracket 56 and cover 58.

Guide shaft 60 is generally elongate and extends substantially parallel and spaced apart from lead screw 40. In the illustrated embodiment, guide shaft 60 is located above lead screw 40. Guide shaft 60 preferably extends at least the full length of lead screw 40. Guide shaft 60 is sized and shaped to cooperate with drive nut 62 as described in more detail hereinafter. Guide shaft 60 has a substantially circular outer surface in cross-section. Guide shaft 60 is supported at its ends by mounting bracket 56 and cover 58.

Drive nut 62 is provided with a pair of substantially parallel and spaced apart bores or openings 68, 70. First bore 68 is adapted to receive lead screw 40 therein and threaded to cooperate with lead screw 40 so that rotation of lead screw 40 causes drive nut 62, when held against rotation therewith, to axially move along the length of lead screw 40 as lead screw 40 rotates. Second bore 70 is adapted to receive guide shaft 60 therein and is generally smooth to cooperate with guide shaft 60 so that drive nut 62 is held against rotation with lead screw 40 and slides along guide shaft 60 as drive nut 62 travels along lead screw 40. Drive nut 62 is also provided with attachment 72 for connecting flexible cable 74 (FIGS. 8, 9 and 10) of cable system 18. Attachment 72 includes third bore 73 for receiving one end 75 of a connector of the core or strand of flexible cable 74. It should be noted that attachment 72 is preferably provided as near first bore 68 as possible so that flexible cable 74 is as close as possible to the axis of lead screw 40 to limit the amount of off-axis loading and resulting efficiency losses. Attachment 72 is centrally located between spaced apart bores 68, 70 so that the axis of attachment 72, and thus the line of force of cable 74, is located centrally therebetween. Cover 58 is provided with opening 76 for connection of one end 75 of cable 74 to drive nut 62. Opening 76 is preferably sealed in a suitable manner as is conventional.

It should be noted that the axis of bore 73, attachment 72, and cable 74 attached thereto, is offset from the rotation axis of lead screw 40. This arrangement reduces the packaging size because it eliminates the interference which, is present when a coaxial attachment is used with a generally short drive nut. To eliminate the interference, a relatively long drive nut has typically been utilized. The offset of the present invention permits the use of a relatively short drive nut 62 and thus a much smaller packaging size. Drive nut 62 is preferably has a length less than about ¼ the length of lead screw 40, more preferably less than about ⅕ the length of lead screw 40, and even more preferably less than about ⅙ the length of lead screw 40. In the illustrated embodiment, drive nut 62 has a length which, is about ⅐ the length of lead screw 40.

Electric motor 22 is preferably reversing; that is, it operates to rotate in both directions. However, the lead screw is non-reversing to retain generated cable load, that is, the force of tensed cable 74 is borne mechanically by the pitch of lead screw 40 and cooperating drive nut 62. By utilizing a purely mechanical element, this cable tension is held indefinitely, or until an input is supplied to release EPB system 10. During the period of time when cable tension is being held and EPB system 10 is not in an apply or release cycle, and consequently the current draw by motor 22 on vehicle electrical system is 0 amps.

While cable tensioning device 12 of the illustrated embodiment can be located at any convenient location of the motor vehicle, device 12 is ordinarily located within an interior region of the motor vehicle (e.g., trunk, spare tire compartment, behind truck seat, or other location). By locating device 12 in an interior location, corrosive and vibrational effects of the environment are reduced. It is noted, however, that device 12 of the present invention is provided in sealed housings and thus can be located in any desired location. To minimize the cost of cables, electric motor 22 can be located as close to the rear or braked wheels as possible.

Figure 8:
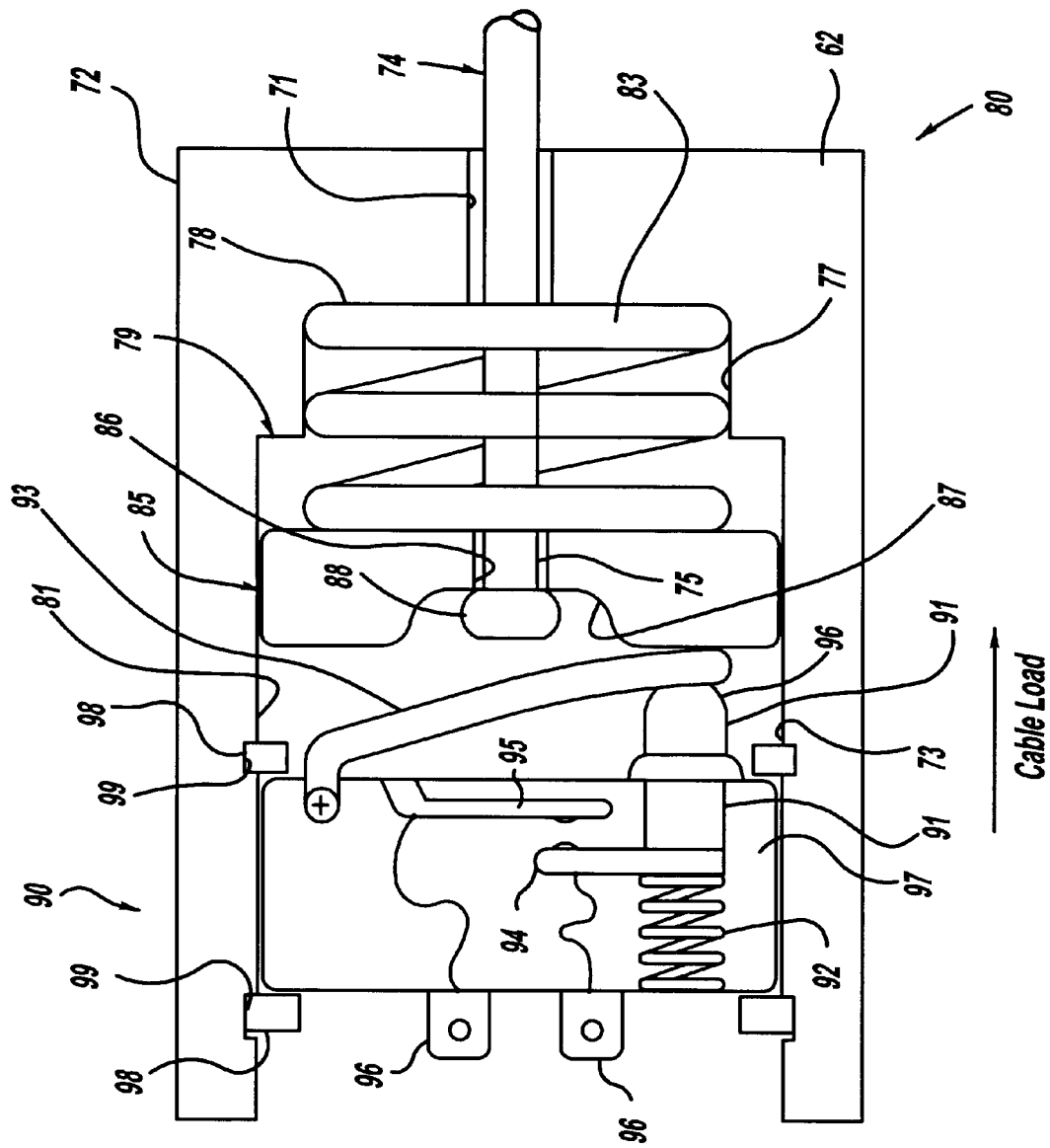
FIG. 8 is a partial cross sectional view of a the cable tension feedback device of FIGS. 2 to 7

As best shown in FIG. 8, the illustrated cable tension feedback device 80 is mounted in third bore 73 of drive nut 62. As stated earlier, one end 75 of cable 74 extends through third bore 73. Third bore 73 may optionally be a notch, with an open axial slot. Third bore 73 includes small aperture 71, to allow one end 75 of cable 74 to extend into chamber 77 and large aperture 81. Chamber 77 has a seat 78 at the bottom of chamber 77. Large aperture 81 forms a ledge 79 between chamber 77 and aperture 81. Large aperture 81 is larger in diameter than chamber 77. Device 80 also includes biasing member 83, retainer member 85 and limit switch 90. Biasing member 83 is inserted into chamber 77 so that one end abuts seat 78. Biasing member 83 is disposed around one end 75 of cable 74 and may be a conventional cylindrical or conical spring with wire of rectangular, square or circular cross-section or any other device with elastic properties where the ratio of load to deflection or displacement is substantially a constant such as a straight bar spring of a rectangular, square or round cross-section or a plate spring, which is rectangular, or triangular in shape either unitary or laminated or an elliptic spring. The other end of biasing member 83 abuts against one side of retainer member 85. Retainer member 85 is an annular configuration with hole 86 and hollow portion 87 on its other side. One end 75 extends through hole 86 and hollow portion 87. Fastener member 88 is attached to one end 75 to capture cable 74 and prevent one end 75 from passing through hole 86. Fastener 88 is conventional and is disposed in hollow portion 87 on the other side of retainer 85. When cable 74 is pulled by drive nut 62, biasing member 83 is compressed between seat 78 and retainer member 85. As the load on cable 74 increases, the biasing force of biasing member 83 increases as member 83 is compressed into chamber 77 and retainer 85 is displaced toward ledge 79. Ledge 79 prevents overcompression of biasing member 83 by limiting the displacement and movement of retainer 85 toward seat 78.

Limit switch 90 may be a spring-loaded microswitch or other similar device, which is disposed in large aperture 81, so as to be adjacent to cable retainer 85. Limit switch 90 includes plunger 91, spring 92, and plunger 93, all of which are located in sensor housing 97, as is conventional. Plunger 91 is connected to first contact 94, which is biased by spring 92 so that head 96 extends partially above the top of housing 97. Plunger arm 93 presses on head 96 of plunger 91. Those skilled in the art will recognize that plunger arm 93 assures that a normal force is applied to plunger 91. Optionally, plunger arm 93 may be omitted. First contact 94 is normally adjacent but spaced apart from second contact 95. Microswitch 90 is located in aperture 81 by two axially spaced a part retaining rings 98. A pair of spaced a part grooves 99 are formed in aperture 81 in housing 97. Each retaining ring 98 is disposed in its respective groove 99 to fix the location of limit switch 90 so that limit switch 90 is adjacent but spaced apart from cable retainer 85.

Returning back to FIG. 7, when lead screw 40 is rotated, drive nut 62 moves axially along the length of lead screw 40 causing cable 74, biasing member 83 and cable retainer 85 to move to place a tension load on cable 74. As this occurs, cable 74 stretches and causes fastener 88 to abut against cable retainer 85. This in turn causes retainer 85 to displace or move axially and compress biasing member 83. Biasing member 83 is sized to form a tension load with a predetermined movement or displacement in cable 74 in order to actuate the park brake arms/pads of a conventional braking system 20. As retainer 85 moves toward the predetermined movement distance, plunger arm 93 and plunger 91 are biased by spring 92 to maintain contact with retainer 85.

When the predetermined distance is reached and the predetermined tension force on cable 74 is achieved, plunger arm 93 presses on head 96 and causes first contact 94 to engage second contact 95 and an electrical circuit is made, which sends a signal to control module 4 to stop the rotating of output shaft 30 of electric motor 22. The tension force on cable 74 is determined by the Hookes law as described in formula:

$$F=KX$$

Where F—Force, lbs.

X—Distance, inches

K—Biasing member (constant)

Thus, when a predetermined force is applied to biasing member 83 and the predetermined compression or displacement on biasing member 83 is known, the biasing member constant is determinable. Thus, when another force or tension in cable 74 is imposed on the biasing member 83, by knowing the predetermined distance or compression of biasing member 83, the tension in cable 74 is thus determined.

In a second embodiment of the present invention, the electric park brake system is designated by the numeral 110. Where the elements in this embodiment are the same as in the first embodiment, the same numerals will be used.

Electric brake system 110 includes cable-tensioning device 112, electronic control module 14, operator input device 16 and cable system 18. Cable tensioning device 112 includes electric motor 22, tension feedback device 180.

Figure 9:
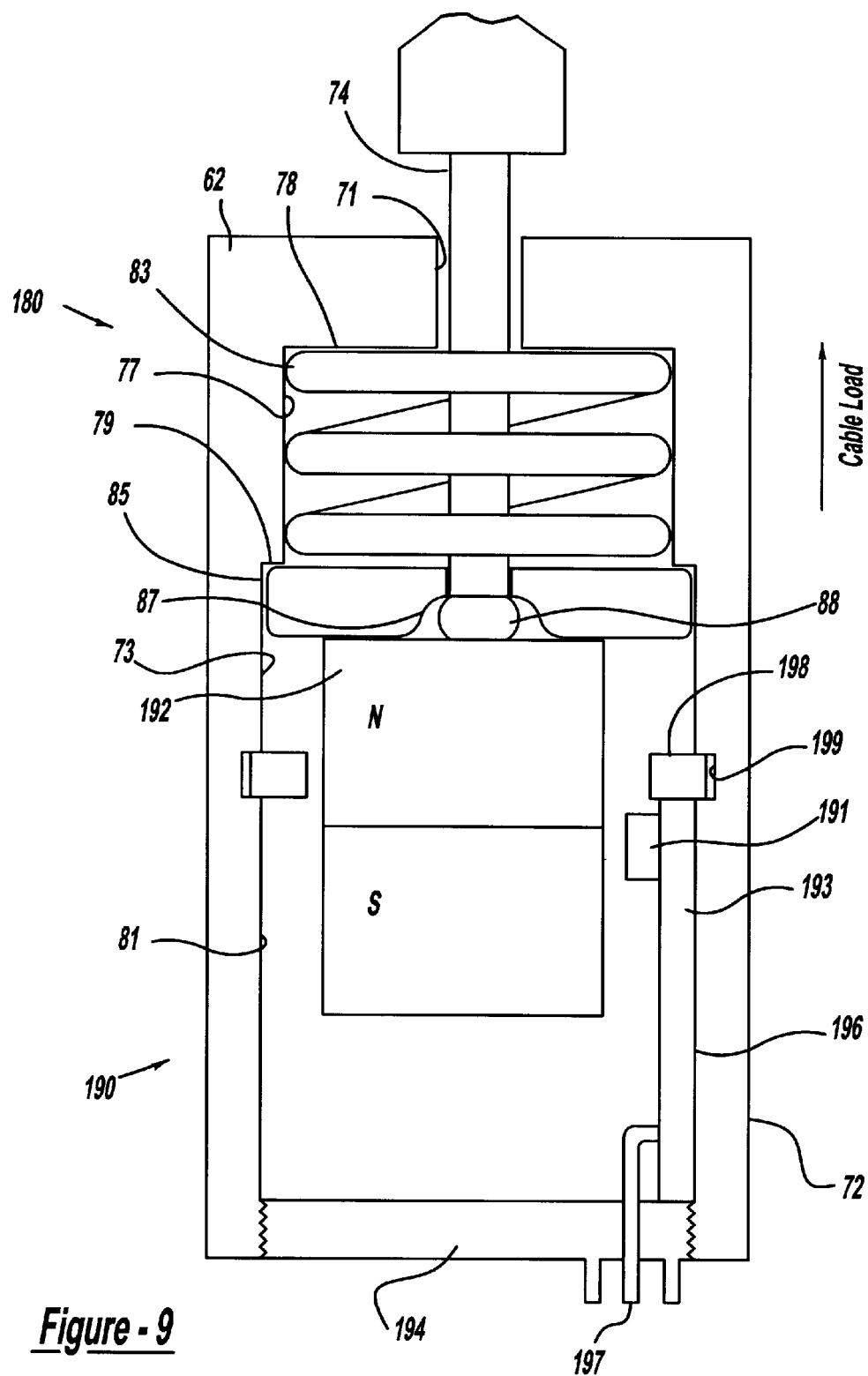
FIG. 9 is a partial cross-sectional view of a first alternate embodiment of the tension feedback device.

As shown in FIG. 9, cable-tension feedback device 180 is mounted in bore 73 of drive nut 62. Device 180 includes biasing member 83, retainer member 85 and hall sensor 190.

Hall sensor 190 includes linear hall sensor 191 with an integrated circuit is used in conjunction with magnet 192 to measure distance. The printed or integrated circuit board is used to physically mount the hall sensor and additional electronic components. The additional components are for protection of the sensor and electro-magnetic compatibility. Linear hall sensors are well known and are available from MELEXIS INC. of Concord N.H. or other sources. In a linear hall sensor, linear motion for approximately 50% percent of the entire length of an adjacent longitudinal magnet is translated into a linear voltage.

Hall effect is a term well known in the art and occurs when a current carrying component is placed into a magnetic field and as a result, a voltage difference is generated between the opposite ends of the current carrying component when the magnet passes perpendicular to the current carrying component.

In the second embodiment, longitudinal magnet 192 is attached to retainer member 85 so that magnet 192 extends axially from retainer member 85 and away from seat 78. Thus, the north pole is located adjacent to the opposite side of retainer member 85. Alternatively, the south pole can be located adjacent to the opposite side of retainer member 85. To limit the axial travel of magnet 192 in aperture 81, retainer ring 198 is located in annular groove 199 which is formed on the interior wall 196 of drive nut 62 in aperture 81. When retainer member 85 moves axially and abuts against retaining ring 198, the south pole is adjacent but spaced away from the bottom of cap 194. Cap 194 is threadably or otherwise engaged to the interior wall 196 of drive nut 62 in aperture 81 to seal tension feedback device 180 from dirt and other debris which may enter into thread bore 73 and permits terminals 197 to be located externally from drive nut 62. Terminals 97 are connected to control module 14.

Between retaining ring 198 and cap 194 along the interior wall 196 and adjacent but spaced away from magnet 192, linear hall sensor 191 and its associated circuit board 193 are located. Circuit board 193 is conventionally connected to terminals 197. When electric motor 22 is activated and drive nut 62 moves to put a tension load on cable 74, magnet 192 passes by linear hall sensor 191, as this occurs, a voltage change is generated which is related to the predetermined displacement of retainer member 85 towards seat 78. Once the predetermined displacement is achieved, proper tension in cable 74 occurs. The voltage signal from linear hall sensor 191 is conveyed through circuit board 193 to terminals 197 to control module 14 to stop the rotation of electric motor 22. Those skilled in the arts will recognize, that linear hall sensor 191 generates a voltage at its output that is proportional to the strength of the magnetic field. The strength of the magnetic field on the hall sensor changes as the tension on the cable increases. The control module 14, while controlling the application of the park brake, also monitors the analog voltage signal supplied by the hall sensor. As the load increases, the output of the halls sensor changes in proportion to the change in cable load. Once a predetermined load is reached, the control module stops the application of the park brake. In all other aspects, the operation of the second embodiment of the present invention is the same as in the first embodiment.

In the third embodiment of the present invention, the electric park brake system is designated by the numeral 210. Where the elements in this embodiment are the same as in the first or second embodiment, the same numerals will be used.

Electric brake system 210 includes cable-tensioning device 212, electronic control module 14, operator input device 16 and cable system 18. Cable tensioning device 112 includes electric motor 22, transmission assembly 24, drive nut assembly 26 and tension feedback device 280.

Figure 10:
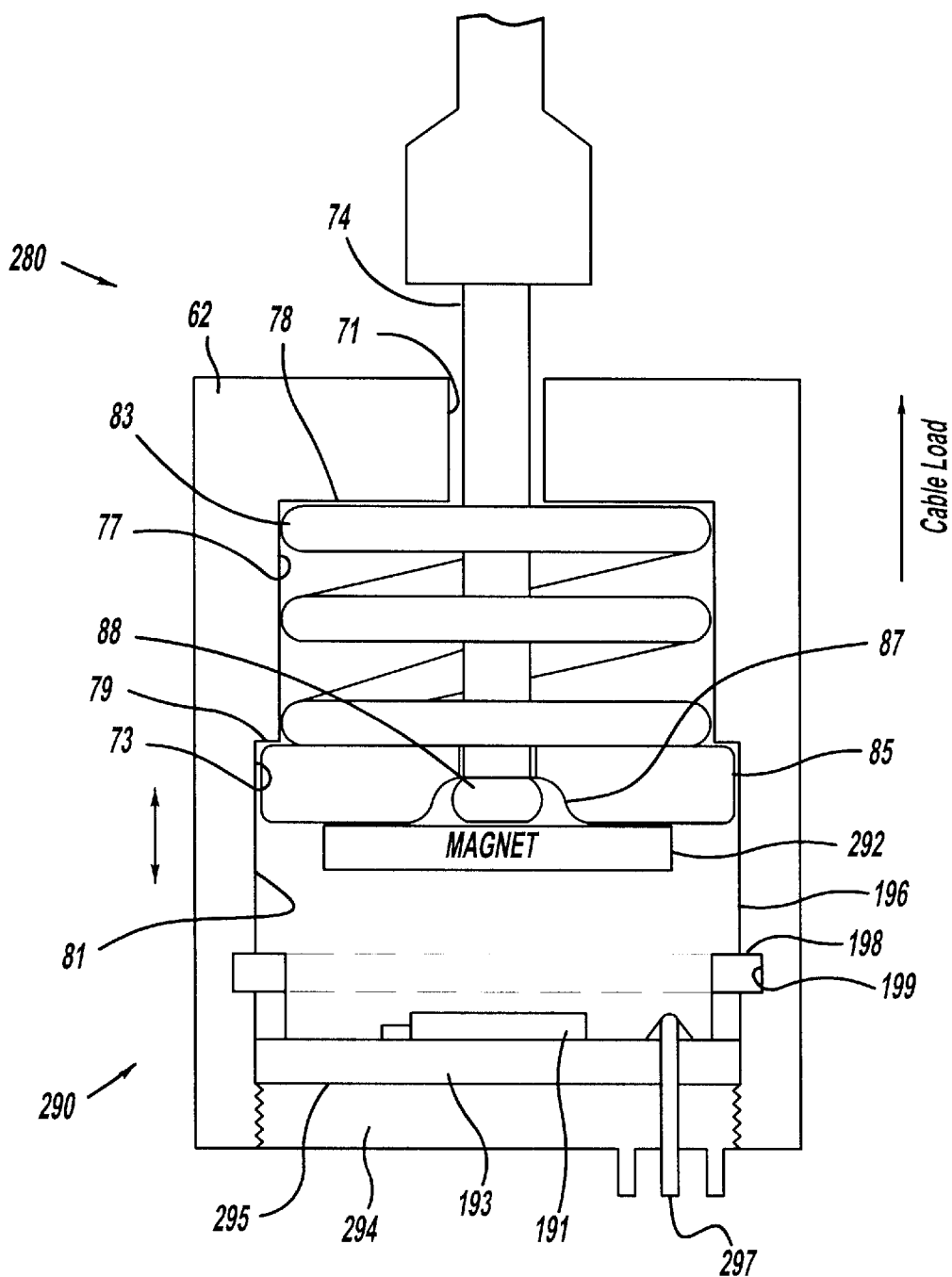
FIG. 10 is a partial cross-sectional view of a second alternate embodiment of the tension feedback device.

As shown in FIG. 10, tension feedback device 280, is mounted in third bore 73 of drive nut 62. Device 280 includes biasing member 83, retainer member 85 and hall sensor 290.

Hall sensor 290 includes a linear hall sensor 191, and circuit board 193, which is used in conjunction with magnet 292. Magnet 292 is attached to the opposite side of retainer member 85. To limit the axial travel of retainer member 85, retaining ring 198 is located in an annular groove 199 which is formed in the interior wall 196 of drive nut 62 in aperture 81. When retainer 85 moves axially and abuts against retaining ring 198, magnet 292 is adjacent but spaced away from linear hall sensor 191 and circuit board 193. Board 193 is located on the interior bottom surface 295 of cap 294. Cap 294 threadably or otherwise engages the interior wall 196 of drive nut 62 of aperture 81, to seal tension feedback device 280 from dirt and debris which may enter into third bore 73 and permits terminals 297 to be located externally of drive nut 62.

The snap ring 198 is also sized to provide an axial stop for retainer member 85 when cable 74 moves away from seat 78 in drive nut 62 and to prevent magnet 292 from contacting linear hall sensor 191. Thus, there is a gap between magnet 292 and sensor 191 at all times. Hall sensor 191 is preferably a linear hall sensor. Because of the sensors orientation to the magnetic field, the output voltage of the hall sensor is inversely proportional to the square of the distance between the magnet and the hall sensor. Alternatively, the sensor may be a hall-effect switch. The hall-effect switch has a non-linear response characteristic.

The hall sensor 191 in this embodiment acts as a proximity switch. When the magnetic pole is adjacent to the hall device 191, the magnetic field intensity is greatest. Additionally, when the magnet 292 is away from the face of hall device 191, the magnetic field intensity decreases exponentially as magnet 292 is moved away from the face of hall device 191. In this environment the hall sensor 290 functions as an on/off switch. When the electric motor 22 is activated and drive nut 62 moves to put a tension load on cable 74, and when the displacement of the magnet 292 and retainer member 85 are at a predetermined distance from hall device 191, hall device 191 no longer senses the magnetic field of the magnet 292, and the switch sends a signal to the control module 14 to stop the rotation of the electric motor 22. In all other aspects the operation of the third embodiment of the present invention is the same as in the first embodiment.

In the fourth embodiment of the present invention, the EPB system is designated by the numeral 310. Where the elements in this embodiment are the same as in the first, second or third embodiments, the same numerals will be used.

Electric brake system 310 includes cable tensioning device 312, electronic control module 14, operation input device 16 and cable system 18. Cable tensioning device 312 includes electric motor 22, transmission assembly 24, drive nut assembly 26 and tension feedback device 380.

Figure 11:
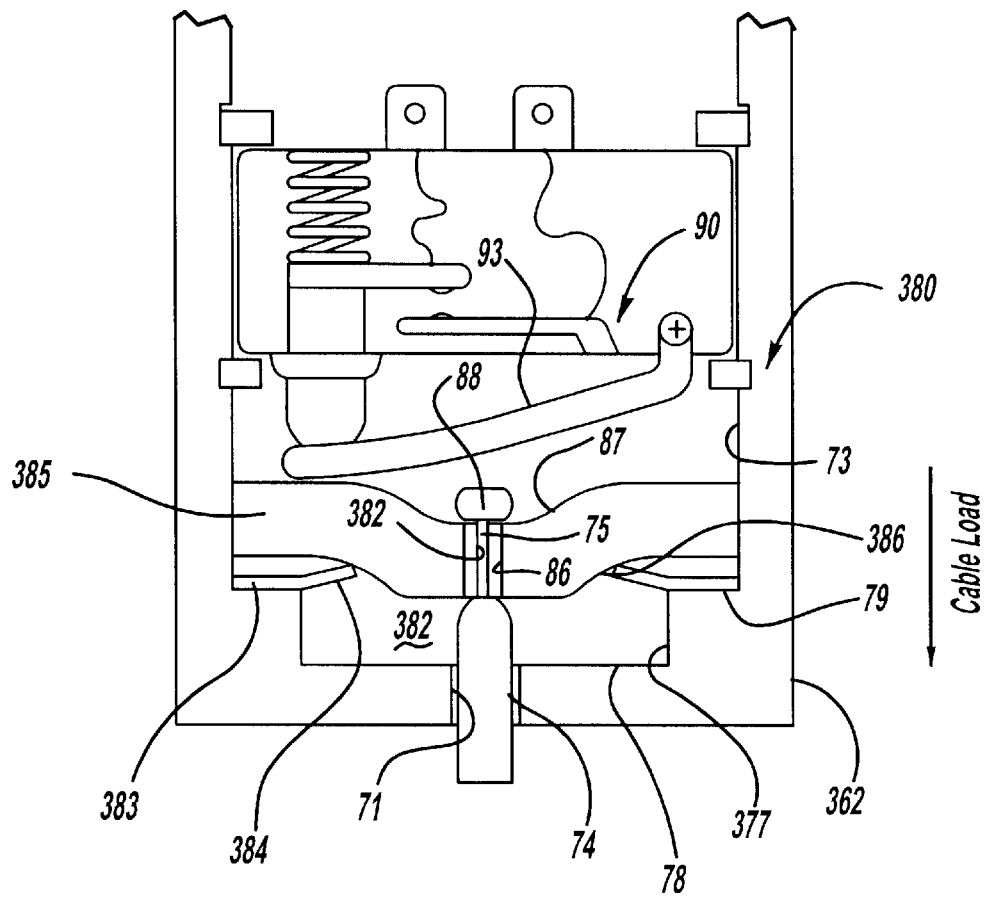
FIG. 11 is a partial cross-sectional view of a third alternate embodiment of the tension feedback device.

Tension feedback device 380 is mounted in third bore 73 of drive nut 362 as shown in FIG. 11. Device 380 includes biasing member 383, retainer member 385 and microswitch 90. Alternatively, device 380 may utilize hall sensor 190 or hall sensor 290 instead of microswitch 90, depending on the application requirements.

Biasing member 383 has an annular shape with resilient fingers 384 extending radial into bore 382. The number of fingers 384 can vary between 1 and 20 depending on the application requirements. Biasing member 383 preferably has four fingers, which have elastic properties such that the ratio of load to deflection or displacement is in a Hookes Law relationship. Alternatively, biasing member 383 may be a conical spring washer also known as a Belleville washer with at least one conical disc but optionally as many conical discs as needed to provide the desired load to displacement relationship required to apply the teachings of the invention, or further optionally a wave spring. Because biasing member 383 is relatively compact, the space requirements of tension feedback device 380 is reduced this facilitates meeting tight packaging restraints imposed by some applications. Thus, chamber 377, is normally not as deep axially as chamber 77, and ledge 79 is located adjacent but spaced axially away from seat 78. The axial distance from ledge 79 to seat 78 is sufficient to permit biasing member 383 to move axially into chamber 377 without contacting seat 78. Biasing member 383 abuts against one side of retainer member 385.

Retainer member 385 has an annular shape with hole 86 and hollow portion 87 on its other side. One end 75 of cable 74 extends through bore 382, hole 71 and hollow portion 87, and end 75 is secured to retainer 385 by fastener 88. One side of retainer member 385 has an axially extending portion 386 with a radial portion smaller than bore 382. Thus, when retainer member 385 is moved by cable 74 toward seat 78, portion 386 bears against biasing member 383 and forms a force proportional to the movement or displacement of biasing member 383 so that when a predetermined distance or movement of member 383 occurs, a tension force is developed in cable 74. Portion 386 is sized radially and axially to allow member 383 to move into chamber 377 without interference with the walls in chamber 377. In all other aspects, the operation of the fourth embodiment is the same as in the first embodiment.

As best shown in FIGS. 1–8, control module 14 is provided with suitable logic and memory electronics for operating cable-tensioning device 12 in a desired manner. Control module 14 receives input signals from operator-input device 16 and cable-tensioning device 12. Operator-input device 16 preferably sends signals to control module 14 to apply or release parking brakes 20. It should be noted that control module 14 can alternately or additionally receive signals from a motor vehicle control system to automatically apply or release parking brakes 20 as desired. Cable-tension feedback device 80 sends a signal to control module 14 indicating cable tension such as by, retainer displacement information from the spring loaded microswitch 90 or hall effect sensors 190, 290 respectively, indicating a predetermined displacement of retainer 85. Control module 14 preferably sends signals to operator-input device 16 indicating that parking brakes 20 are applied or that there has been a failure to apply or release the parking brakes. Control module 14 preferably sends signals to cable-tensioning device 12 to start and stop electric motor 22.

When applying brakes 20, control module 14 is preferably adapted to stop electric motor 22 when a predetermined compression of biasing member 83 is achieved, and as a result, proper cable tension is obtained. As stated earlier, cable tension is directly measured by tension feedback device 81. When releasing brakes 20, control module 14 is preferably adapted to stop electric motor 22 after a predetermined cable travel or distance. Cable travel can be directly measured or can be indicated when a predetermined number of rotations have been made by the electric motor 22 or another rotating component. By applying and releasing brakes 20 in this manner, EPB system 10 is automatically self-adjusted to compensate for cable stretch, brake pad wear, and other variables, as described in U.S. Pat. No. 6,213,259 owned by the assignee of the present application, the disclosure of which is expressly incorporated herein in its entirety. When applying parking brakes 20, control module 14 preferably monitors both the tension, such as by cable tension feedback device 80, and the travel, such as from rotation signals from another hall effect device. The tension information is utilized to stop electric motor 22 at a predetermined amount of cable travel or displacement. The travel information is utilized as a secondary check to stop electric motor 22 if device 12 and/or cable 74 has traveled a predetermined distance which indicates that there is something wrong with system 10. The predetermined distance can be, for example, a certain percentage (e.g. 25%) more than the distance traveled the previous time the parking brakes 20 were applied. When parking brakes 20 are released, control module 14 simply stops electric motor 22 when the predetermined distance is traveled. In either apply or release, control module 14 preferably stops the electric motor if the predetermined tension and/or distance is not reached in a predetermined amount of time. Optionally, an EPB status light may also be incorporated into the EPB apply/release switch to show the apply condition or the release condition or both.

Operator-input device 16 is preferably located within the vehicle interior for allowing the vehicle operator to selectively send signals to control module 14. While any suitable control device 16 can be employed, input device 16 preferably includes an input switch so that the operator can manually select to apply or release parking brakes 20 and an illuminated indicator or brake light on the vehicle's instrument panel that indicates the status of parking brakes 20. The switch and the brake light are electrically connected to control module 14. The instrument panel brake light is illuminated by control module 14 only upon the completion of a "successful" parking brake application cycle such as, for example, reaching the predetermined shut-off motor current. Control module 14 does not illuminate the instrument panel brake light when the vehicle ignition key is in the "off" position. If a parking brake application cycle is not "successful", such as, for example, the predetermined cut-off current is not reached within the predetermined distance, control module 14 pulses illumination of the brake light to indicate an EPB system fault (e.g., "blinking light" pulse at a rate of two pulses per second). If EPB system 10 is applied with the vehicle ignition key in the "off" position, control module 14 illuminates the instrument panel brake light immediately upon the operator turning the vehicle ignition key to the "on" position. Regardless of the EPB system status or operator input, the instrument panel brake light is not illuminated with the vehicle ignition key in the "off" position at any time.

In operation, when the operator of the motor vehicle desires to electrically apply parking brakes 20, the operator sends an apply signal to control module 14 via the operator input device. In response to the apply signal, control module 14 starts rotation of the output shaft 30 of the electric motor 22 in the suitable direction. Rotation of the motor output shaft 30 moves the gear train to rotate the lead screw 40. In the illustrated embodiments, rotation of motor output shaft 30 rotates first pinion gear 28 by means of connecting shaft 32, rotation of first pinion gear 28 rotates idler gear 34 through the interlocking teeth therebetween, rotation of the idler gear 34 rotates the second pinion gear 36 through the rigid connection therebetween, rotation of second pinion gear 36 rotates lead screw gear 38 through the interlocking teeth therebetween, and rotation of the lead screw gear rotates lead screw 40 through the rigid connection therebetween. Rotation of lead screw 40 causes translation of drive nut 62, toward the gear train and away from the cable assembly 18, which is threadably engaged on lead screw 40 and held against rotation by guide shaft 60. The translation of the drive nut 62 pulls and tensions cable 74 to apply brakes 20. As drive nut 62 axially translates along drive screw 40, the drive nut slides along the guide shaft. As electric motor 22 is operating, control module 14 monitors a signal from limit switch 90. When first contact 94 engages second contact 95, a signal is sent to control module 14, which indicates that cable 74 has achieved the desired displacement of biasing member 83, and thus, tension in the cable, control module 14 stops electric motor 22 and illuminates the brake light on the vehicle's instrument panel to indicate a successful application of brakes 20. As electric motor 22 is operating, the control module 14 also monitors the number of rotations of the electric motor 22 via the other hall effect sensor. If the number of motor rotations reaches a predetermined number of rotations, which indicates a predetermined travel or distance moved of cable 74 prior to a signal from limit switch 90, control module 14 stops electric motor 22 and optionally blinks the brake light on the vehicle's instrument panel to indicate an unsuccessful application of the brakes.

When the operator of the motor vehicle desires to electrically release parking brakes 20, the operator sends a release signal to control module 14 via the operator input device. In response to the release signal, the control module starts rotation of output shaft 30 of electric motor 22 in the suitable direction, which is opposite the apply direction. Rotation of motor output shaft 30 moves the gear train to rotate lead screw 40. In the illustrated embodiment, rotation of motor output shaft 30 rotates first pinion gear 28 via connecting shaft 32, rotation of first pinion gear 28 rotates idler gear 34 through the interlock teeth there between, rotation of idler gear 34 rotates second pinion gear 36 through the rigid connection there between, rotation of second pinion gear 36 rotates lead screw gear 38 through the interlocking teeth there between, and rotation of the lead screw gear rotates lead screw 40 through the rigid connection there between. Rotation of lead screw 40 causes translation of drive nut 62, away from the gear train and toward cable assembly 18 which is threadably engaged to lead screw 40 and held against rotation by guide shaft 60. The translation of drive nut 62 releases and untensions cable 74 to release brakes 20. As drive nut 62 axially translates along drive screw 40, drive nut slides along the guide shaft. As electric motor 22 is operating, control module 14 monitors the number of rotations of electric motor 22 via the other hall effect sensor. When the number of motor rotations reaches a predetermined number of rotations, which indicates predetermined travel or distance moved of cable 74, the control module 14 stops electric motor 22. If the predetermined number of rotations is not reached in a predetermined period of time, which indicated there has been a system failure, control module 14 stops electric motor 22 and blinks the brake light on the vehicle's instrument panel to indicate an unsuccessful release of brakes 20.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the power train can each have many different configurations and can be formed of many different manners such as the gear train can be replaced or partially replaced with a pulley/belt assembly, or the tension feedback device 80 may be mounted on the other end of cable 74. The embodiments discussed were chosen and described to provide the best illustration of the principles of the present invention and its practical application to thereby enable one of ordinary skill in the art to utilize the invention in various embodiments and with various modifications as are suited to the particular use contemplated. For example a non-contacting limit switch, such as, an optical device can be used instead of the microswitch or hall sensors described herein. All such modifications and variations are within the scope of the present invention as determined by the appended claims when interpreted in accordance with the benefit to which they are fairly, legally, and equitably entitled.

The invention as claimed is:

1. An electric park brake system adapted for controlling the load in a cable attached to a brake, said electric park brake system comprising, in combination:
   an electric motor having an output shaft;
   a control module coupled to the electric motor for controlling the rotation of the output shaft;
   a transmission adjacent to the output shaft, the transmission having a threaded lead screw coupled to the output shaft for rotation therewith and a guide shaft;
   a drive nut adjacent to the lead screw, the drive nut being slidably guided along the shaft to prevent rotation of the drive nut with the lead screw, the drive nut moving linearly along the lead screw when the lead screw is rotated, the drive nut having an attachment portion forming an internal bore including a seat at the bottom of the bore;
   a retainer member coupled to the cable and disposed in the internal bore of the attachment portion;
   a biasing member disposed in the internal bore, the biasing member urging the retainer member away from the seat; and
   a switch adjacent to the retainer, the switch being adapted to measure the displacement of the cable toward the seat when the electric motor rotates the lead screw and further being adapted to provide a signal to the controller when a predetermined distance is formed between the switch and the retainer in order to stop the rotation of the electric motor;
   whereby the cable is compensated for stretch and a predetermined load is set on the cable in response to the predetermined displacement of the biasing member in the internal bore.

2. The system as claimed in claim 1 wherein said switch is one of a contact switch, and a non-contact switch.

3. The system as claimed in claim 1 wherein the bore having a chamber, an aperture and forming at least one undercut between the chamber and the aperture.

4. The system as claimed in claim 1 wherein the biasing member is a spring having one of a square cross-section, a rectangular cross-section and a round cross-section.

5. The system as claimed in claim 1 wherein said bore is sealed with a cap.

6. The system as claimed in claim 1 wherein the movement of said retainer member toward said seat is limited by a stop in the bore to prevent overcompression of the biasing member.

7. The system as claimed in claim 1 wherein said tension feedback device is a linear hall device.

8. A cable tensioning device adapted for controlling the tension load in a cable that is actuated by an electric motor having an output shaft and a transmission coupled to the output shaft and including a lead screw said cable tensioning device comprising, in combination;
   a guide shaft;
   a drive nut coupled to the lead screw, the drive nut being slidably guided along the guide shaft to prevent rotation of the drive nut with the lead screw, the drive nut further being adapted to move linearly when the lead screw is rotated, the drive nut having an attachment portion including an internal bore, the bore including an aperture, a portion forming a chamber and a ledge between the aperture and the chamber;
   the cable extending through the bore in the attachment portion;
   a retainer coupled to the cable in the attachment portion;
   a biasing member disposed in the chamber and urging the retainer away from the ledge; and
   a switch adjacent the retainer, the switch being adapted to measure the displacement of the cable toward the ledge when the electric motor rotates the lead screw and being adapted to stop the rotation of the electric motor when the cable is displaced a predetermined distance in order to compensate for cable stretch and to set a predetermined load on the cable in response to the predetermined displacement of the biasing member in the internal bore.

9. The cable-tensioning device as claimed in claim 8 wherein the switch is one of a microswitch, a hall effect sensor, a hall-effect switch and a limit switch.

10. The cable-tensioning device is claimed in claim 8 wherein said biasing member is one of a coil spring, a conical washer and a plate spring.

11. The cable-tensioning device is claimed in claim 8 wherein said biasing member having elastic properties so that the ratio of the load to displacement is substantially a constant.

12. The cable-tensioning device as claimed in claim 8 wherein said bore is sealed with a cap.

13. The cable-tensioning device as claimed in claim 8 wherein the switch having a magnet.

14. The cable-tensioning device as claimed in claim 13 wherein said magnet is attached to the retainer member.

15. The cable tensioning device is claimed in claim 14 wherein said magnet extends longitudinally is said bore.

16. The cable-tensioning device is claimed in claim 14 wherein said magnet is attached radially to said retainer.

17. The cable-tension device as claimed in claim 8 wherein switch is a hall effect device, said hall effect device measuring the displacement of the cable.

18. The cable-tensioning device as claimed in claim 8 wherein the switch is a linear hall effect device.

19. A cable-tensioning device adapted for controlling the tension load of a brake cable attached to a brake, said cable tensioning device comprising, in combination:
   an electric motor having an output shaft;
   a transmission adjacent to the output shaft, the transmission having a threaded lead screw coupled to the output shaft and a guide shaft;
   a drive nut slidably guided along the guide shaft to prevent rotation of the drive nut with the lead screw, the drive nut being adapted to move linearly when the lead screw is rotated, the drive nut having an attachment portion forming an inner bore including a seat, the cable extending through the bore;
   a retainer member disposed in the bore of the attachment portion;
   a biasing member disposed in the bore and urging the retainer member away from the seat; and
   a switch adjacent to the attachment portion, the switch being adapted to determine the displacement of the cable toward the seat when the output shaft is rotated and being adapted to stop the rotation of the output shaft when the cable moves a predetermined distance so as to compensate for cable stretch and to set a predetermined load on the cable in response to the predetermined displacement of the biasing member in the inner bore.

20. The cable-tensioning device is claimed in claim 19 wherein the switch is one of a microswitch, a hall effect device, a hall-effect switch and a limit switch.

21. An electric park brake system adapted for controlling the load in a cable attached to a brake, said electric park brake system comprising, in combination:
   an electric motor having an output shaft;
   a control module coupled to the electric motor for controlling the rotation of the output shaft;
   a transmission adjacent to the output shaft, the transmission having a threaded lead screw coupled to the output shaft for rotation therewith and a guide shaft;
   a drive nut threadably engaging the lead screw, the drive nut having an attachment portion forming a bore including a seat at the bottom of the bore;
   means for slidably guiding the drive nut along the guide shaft to prevent rotation to the drive nut relative to the lead screw so that the drive nut moves linearly along the lead screw when the lead screw is rotated;
   a retainer member coupled to the cable and disposed in the bore of the attachment portion;
   a biasing member disposed in the bore, the biasing member urging the retainer member away from the seat; and
   a non-contact switch adjacent to the retainer, the switch being adapted to measure the displacement of the cable toward the seat when the electric motor rotates the lead screw and further being adapted to provide a signal to the controller when a predetermined distance is formed between the switch and the retainer in order to stop the rotation of the electric motor;
   whereby the cable is compensated for stretch and a predetermined load is set on the cable in response to the predetermined displacement of the biasing member in the bore.

22. The system as claimed in claim 21 wherein the non-contact switch having a magnet, the non-contact is one of a hall effect sensor and a hall effect switch.

* * * * *